United States Patent
Pfadler et al.

(10) Patent No.: US 11,814,071 B2
(45) Date of Patent: Nov. 14, 2023

(54) VEHICLE, APPARATUS FOR A VEHICLE, COMPUTER PROGRAM, AND METHOD FOR PROCESSING INFORMATION FOR COMMUNICATION IN A TELE-OPERATED DRIVING SESSION

(71) Applicant: VOLKSWAGEN AKTIENGESELLSCHAFT, Wolfsburg (DE)

(72) Inventors: Andreas Pfadler, Berlin (DE); Guillaume Jornod, Berlin (DE)

(73) Assignee: Volkswagen Aktiegensellschaft

( * ) Notice: Subject to any disclaimer, the term of this patent is extended or adjusted under 35 U.S.C. 154(b) by 260 days.

(21) Appl. No.: 17/508,374

(22) Filed: Oct. 22, 2021

(65) Prior Publication Data
US 2022/0135067 A1    May 5, 2022

(30) Foreign Application Priority Data
Nov. 3, 2020    (EP) .................................... 20205431

(51) Int. Cl.
*B60W 60/00*    (2020.01)
*G07C 5/00*    (2006.01)

(52) U.S. Cl.
CPC ........... *B60W 60/001* (2020.02); *G07C 5/008* (2013.01); *B60W 2420/42* (2013.01); *B60W 2420/52* (2013.01)

(58) Field of Classification Search
CPC .................................................. B60W 60/001
See application file for complete search history.

(56) References Cited

U.S. PATENT DOCUMENTS

| | | | | |
|---|---|---|---|---|
| 5,952,943 A | * | 9/1999 | Walsh | H04N 19/63 375/E7.091 |
| 9,061,207 B2 | * | 6/2015 | Perlman | H04L 65/403 |
| 2007/0021879 A1 | | 1/2007 | DelNero et al. | |
| 2007/0121532 A1 | * | 5/2007 | Wenger | H04N 21/6379 370/310 |

(Continued)

FOREIGN PATENT DOCUMENTS

| | | | |
|---|---|---|---|
| CN | 107612886 B | * | 6/2020 |
| EP | 3580929 A1 | | 12/2019 |

(Continued)

OTHER PUBLICATIONS

Search Report for European Patent Application No. 20205431.8; dated Mar. 16, 2021.

*Primary Examiner* — Shelley Chen
(74) *Attorney, Agent, or Firm* — BARNES & THORNBURG, LLP (57) ABSTRACT

A transportation vehicle, an apparatus for a transportation vehicle, a computer program, and a method for processing information for communication in a tele-operated driving session between a transportation vehicle and a remote control center. The method includes establishing a tele-operated driving session between the transportation vehicle and a remote control center obtaining a predicted latency of a communication link between the remote control center and the transportation vehicle for the tele-operated driving session, and adapting at least one codec parameter for coding the information based on the predicted latency.

13 Claims, 3 Drawing Sheets

(56) References Cited

U.S. PATENT DOCUMENTS

| | | | |
|---|---|---|---|
| 2016/0255531 A1* | 9/2016 | Stein | H04L 65/60 |
| | | | 455/575.1 |
| 2016/0314008 A1* | 10/2016 | Han | G06T 1/20 |
| 2018/0376305 A1 | 12/2018 | Ramalho de Oliveira | |
| 2019/0171208 A1 | 6/2019 | Magalhães de Matos | |
| 2019/0363843 A1 | 11/2019 | Gordaychik | |
| 2020/0077278 A1 | 3/2020 | Jornod et al. | |
| 2020/0081431 A1 | 3/2020 | Weiss | |
| 2020/0107212 A1 | 4/2020 | Zielinski et al. | |
| 2020/0311924 A1* | 10/2020 | Schneider | G06T 9/001 |
| 2021/0116907 A1* | 4/2021 | Altman | G05D 1/0038 |

FOREIGN PATENT DOCUMENTS

| | | | | |
|---|---|---|---|---|
| EP | 3723412 A1 | | 10/2020 | |
| JP | 2005346698 A | * | 12/2005 | H04N 1/6058 |
| TW | 201438407 A | * | 10/2014 | H03M 7/30 |
| TW | 201443884 A | * | 11/2014 | G10L 19/26 |
| WO | WO-2014155490 A1 | * | 10/2014 | H03M 7/30 |
| WO | 2015034405 A1 | | 3/2015 | |
| WO | 2019180700 A1 | | 9/2019 | |
| WO | WO-2019180700 A1 | * | 9/2019 | B60W 30/16 |

* cited by examiner

VEHICLE, APPARATUS FOR A VEHICLE, COMPUTER PROGRAM, AND METHOD FOR PROCESSING INFORMATION FOR COMMUNICATION IN A TELE-OPERATED DRIVING SESSION

PRIORITY CLAIM

This patent application claims priority to European Patent Application No. 20205431.8, filed 3 Nov. 2020, the disclosure of which is incorporated herein by reference in its entirety.

SUMMARY

Illustrative embodiments relate to a transportation vehicle, an apparatus for a transportation vehicle, a computer program, and a method for processing information for communication in a tele-operated driving session, more specifically, but not exclusively, to a concept for adapting coding of such information based on a predicted latency of a communication link between a transportation vehicle and a remote control center.

BRIEF DESCRIPTION OF THE DRAWINGS

Disclosed embodiments will be described with reference to the accompanying figures, in which.

DETAILED DESCRIPTION

Tele-operated driving (ToD) might become a key technology to solve issues with L4/L5 (L4: highly automatic, L5: fully automatic) driven vehicles, such as interpretation issues or deadlocks (situations, which cannot be resolved by autonomous or automatic control mechanisms only). These issues occur when automatic driven vehicles (AV) are not able to interpret and to solve a situation (deadlock) due to unclear traffic conditions, e.g., an accident or a construction site. These transportation vehicles may need external instruction from someone else to solve the situation, which can be a remote control center remote from the transportation vehicle. Thus, ToD allows transportation vehicles to be driven remotely in a ToD session by the remote control center and an operator therein, respectively. For this, the transportation vehicle can provide the remote control center and the operator therein with video data of its environment. Due to processing of such video data, the video data may be displayed to the operator with delays. Due to changes of a quality of service of a communication between the AV and the remote control center, those delays may reach an intolerable level for ToD.

Document WO 2015/034405 A1 describes a concept for determining multimedia codec parameters for a multimedia communications session. For this, the concept includes comparing a channel indicator value to a previous channel quality indicator value of a communications channel for the multimedia communications session and determining, based on the comparing, whether to delay adaption of values of a set of multimedia codec parameters or not, and which values of the set of multimedia codec parameters to adapt.

Document US 2007/0021879 A1 discloses a system from collaboratively and autonomously planning and controlling a team of transportation vehicles having subsystems within an environment. The system can adjust mission plans of an unmanned transportation vehicle to keep a quality of service of available system data links at effective levels.

Document US 2020/0107212 A1 discloses a method for predicting a quality of service for a communication link of at least one communication device. The method provides for sending from the communication device a quality of service prediction request message to a communication service prediction server, predicting the quality of service in the communication service prediction server, and sending back a quality of service prediction response message to the communication device.

The documents deal with vehicular communication and/or predicting a quality of service in vehicular communication. Still, none of those documents provides an improvement of tele-operated driving.

Document WO 2019/180700 A1 relates to a device, system, and method of autonomous driving and tele-operated transportation vehicles. It provides that a vehicular Artificial Intelligence (AI) unit is configured to receive inputs from vehicular sensors of a transportation vehicle, locally process the inputs, and wirelessly transmit the inputs to a remote tele-driving processor. It further proposes to wirelessly receive from the remote tele-driving processor, a remotely-computed processing result that is received from a remote Artificial Intelligence (AI) unit and to implement a vehicular operating command based on the remotely-computed processing result, via an autonomous driving unit of the transportation vehicle or via a tele-driving unit of the transportation vehicle.

Document EP 3 723 412 A1 relates to a system, a transportation vehicle, apparatuses, methods, and computer programs for user equipment, UE, and service provision in a mobile communication system. The method for user equipment, UE, in a mobile communication system comprises using a service with a set of quality of service, QoS, requirements in the mobile communication system, receiving information related to a future course of the QoS provisioning of the service from the mobile communication system, and adapting the service based on the information related to the future course of the QoS and based on the set of QoS requirements.

Document US 2020/0081431 A1 relates to a remote transportation vehicle control system including a video camera system for producing video data. The document provides that a data handling system is connected to a network to transmit data to and receive data from a remote teleoperation site. It also provides that a virtual control system is configured to receive the video, provide a user with a live video stream supported by machine intelligence directed frame synthesis, and transmit control instructions to the remote transportation vehicle over the network. The frame synthesis is supported by a convolutional neural network. The frame synthesis may be used to interpolate frames to increase effective frames per second. The frame synthesis may be used to extrapolate frames to replace missing or damaged video frames.

Therefore, there may be a demand for an improved concept for processing information for tele-operated driving. This demand may be satisfied by the subject-matter of the appended independent and dependent claims.

Disclosed embodiments are based on the finding that a latency/time period for processing (e.g., for encoding and decoding) information (e.g., video data, lidar data and/or radar data) for communication in a tele-operated driving (ToD) session can be adjusted with respect to a predicted latency of a communication link for transmitting the information. This, e.g., allows to keep a total latency for transmitting and processing the information below a maximum allowable limit for a latency of the communication link. The latency for processing the information is adjusted via one or more codec parameters for coding the information.

Disclosed embodiments provide a method for a transportation vehicle and for processing information for communication in a tele-operated driving session. The method comprises establishing a tele-operated driving session between the transportation vehicle and a remote control center. Further, the method comprises obtaining a predicted latency of a communication link between the remote control center and the transportation vehicle for the tele-operated driving session. Also, the method comprises adapting, based on the predicted latency, at least one codec parameter for coding the information.

Establishing the tele-operated driving session, e.g., comprises transmitting a request for remotely controlling the transportation vehicle to the remote control center and/or transferring control of the transportation vehicle to the remote control center.

The skilled person having benefit from the present disclosure will understand that a quality of service (QoS) and, in particular, a latency of the communication link may change over time and/or with the transportation vehicle's position and that the predicted latency (i.e., a later/future latency of the communication link) can be determined using previous latency measurements and/or the transportation vehicle's motion.

Adapting the at least one codec parameter, e.g., comprises selecting a codec for processing the information from a plurality of (different) codecs and/or determining one or more codec parameters of a codec setting of a codec. For example, one of the codecs H.26x or Moving Picture Experts Group (MPEG), Lossless Codec Library (LCL) codec may be selected, a compression technique (e.g., discrete cosine transform (DCT) or motion compensation (MC)) may be determined, and/or other characteristics (e.g., a buffering time for compression, e.g., video compression) of a codec for processing the information may be determined by adapting the at least one codec parameter. Adapting the at least one codec parameter based on or with respect to the predicted latency enables to adapt the processing of the information sufficiently early to changing latencies of the communication link, e.g., such that a total latency for processing and transmitting the information is kept at a tolerable level for ToD if the latencies of the communication link changes (abruptly). The information can be environmental information on the environment of the transportation vehicle.

In some exemplary embodiments, the information comprises video data, radar data, object data and/or lidar data of the environment of the transportation vehicle. This enables the remote control center to display a visual representation of the environment to an operator controlling the transportation vehicle from remote and keep a total latency for processing and transmitting such data at a tolerable level for ToD.

In some exemplary embodiments, the method further comprises obtaining for one or more codec parameters a latency for encoding the information at the transportation vehicle. Also, the method may comprise receiving, from the remote control center, for the one or more codec parameters a latency for decoding the encoded information at the remote control center. Further, adapting the at least one codec parameter may comprise adapting the at least one codec parameter based on the latencies for encoding and decoding the information.

The latency for encoding the information may be determined by a buffering time for compression of the information, e.g., for video compression of video data.

The transportation vehicle can receive the latency for decoding the information from the remote control center (wirelessly) via the above communication link or a separate communication link.

This, for example, allows the transportation vehicle to adapt the at least one codec parameter with respect to the latencies for encoding and decoding, e.g., to keep a total latency including the latencies for decoding and encoding at an appropriate level for ToD.

In some exemplary embodiments, the method further comprises obtaining a maximum latency for the communication of the information in the tele-operated driving session. Further, adapting the at least one codec parameter may comprise adapting the at least one codec parameter based on the maximum latency.

The maximum latency, e.g., is a (predefined) maximum tolerable latency in ToD applications for processing and transmitting the information (e.g., the video data) from the transportation vehicle to the remote control center. Adapting the at least one codec parameter based on the maximum latency, e.g., includes adapting the at least one codec parameter such that a latency for processing and transmitting the information is lower than the maximum latency. The skilled person will appreciate that this, e.g., allows the latency not to be too high for ToD.

In some exemplary embodiments, obtaining the maximum latency comprises determining the maximum latency based on information on the transportation vehicle and/or a traffic situation.

The skilled person having benefit from the present disclosure will appreciate that a maximum tolerable delay of the information when controlling the transportation vehicle from remote may depend on a motion (e.g., a velocity or speed), capabilities (e.g., braking power, weight, etc.), and/or a traffic situation, e.g., indicative of a traffic density, local road traffic regulations, and/or the like. Therefore, determining the maximum latency based on information on the transportation vehicle (e.g., velocity/speed, or the transportation vehicle's capabilities) and/or the traffic situation allows to keep the latency for processing and transmitting the information below the maximum tolerable delay with respect to the traffic situation and the transportation vehicle.

In some exemplary embodiments, the method further comprises obtaining a predicted data rate of the communication link. Further, adapting the at least one codec parameter may comprise adapting the at least one codec parameter based on the predicted data rate of the communication link. This, e.g., further allows exploit the data rate for transmitting the information to the remote control center.

Further exemplary embodiments provide a method for a remote control center. The method comprises establishing a tele-operated driving session between the remote control center and a transportation vehicle. Further, the method comprises determining a latency for decoding information for communication in the tele-operated driving session. The method further comprises transmitting the latency to the transportation vehicle for adapting based on the latency at least one codec parameter for coding the information. As mentioned above in connection with the method for the transportation vehicle, the latency for decoding the encoded information enables the transportation vehicle to adapt one or more codec parameters with respect to the latency for decoding and, e.g., latencies for processing the information at the transportation vehicle and transmitting the information to the remote control center to not exceed a maximum tolerable delay for ToD.

Disclosed embodiments further provide an apparatus comprising one or more interfaces configured to communicate in a communication network and a data processing circuit configured to control the one or more interfaces, wherein the data processing circuit is further configured to execute one of the methods proposed herein.

Further exemplary embodiments relate to a computer program having a program code for performing at least one of the methods proposed herein, when the computer program is executed on a computer, a processor, or a programmable hardware component.

Disclosed embodiments further provide a transportation vehicle comprising the apparatus disclosed herein. The transportation vehicle, e.g., is a land vehicle. In other applications, the transportation vehicle can also be a watercraft or an aircraft.

Teleoperated Driving (ToD) is becoming a key enabler for automated driving. ToD may help to solve deadlock situations which cannot be solved by an automated driving vehicle itself. ToD may also become a legal requirement for automated driving in an increasing number of countries.

To enable an operator in a remote control center to control the transportation vehicle from remote, the transportation vehicle can communicate information on its environment, e.g., video or other measurement data, to the remote control center. Processing and communication of this information may imply latencies such that the information reaches the operator with a time delay. The larger the time delay, the more difficult and/or dangerous it might be to control the transportation vehicle from remote.

The skilled person will be aware that the latency for the communication of the information may change, e.g., increase (abruptly) due to movements of the transportation vehicle. In some cases, the time delay may hence become inappropriate for ToD.

Hence, there is a demand for an improved concept for communicating in a tele-operated driving session.

This demand may be satisfied by the embodiments described below.

Figure 1:
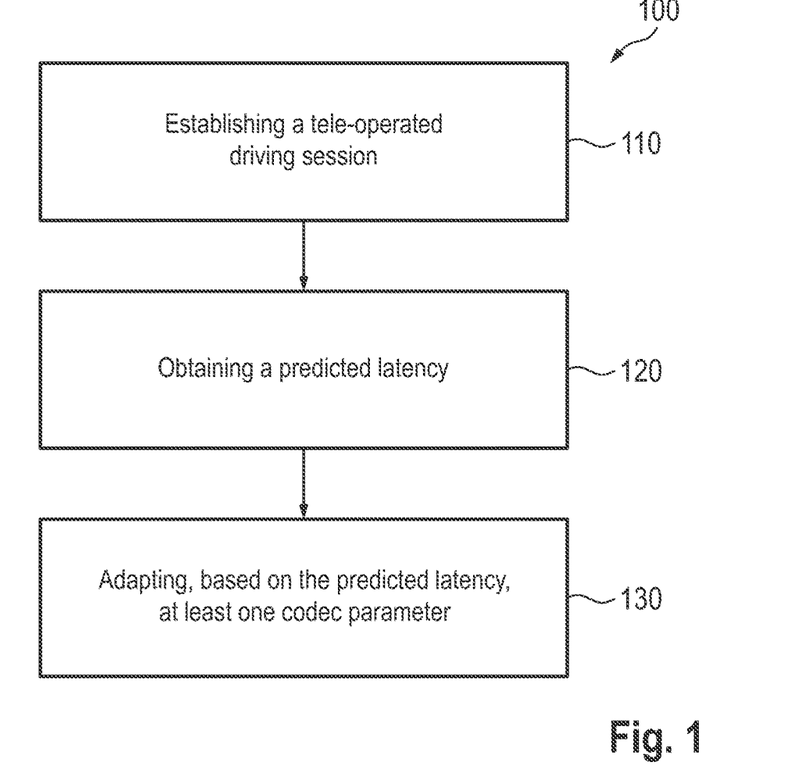
FIG. 1 illustrates a block diagram of an exemplary embodiment of a method for a transportation vehicle and for processing information for communication in a tele-operated driving session.

FIG. 1 illustrates a block diagram of an exemplary embodiment of a method 100 for a transportation vehicle and for processing information for communication in a tele-operated driving session.

Method 100 comprises establishing 110 a tele-operated driving session between the transportation vehicle and a remote control center. For example, in so-called "deadlock situations", in which the transportation vehicle cannot maneuver automatically/autonomously in a safe way, the transportation vehicle may establish or initiate the tele-operated driving session between the transportation vehicle and the remote control center. Establishing 110 the tele-operated driving session, e.g., includes establishing the communication link to the remote control center. Optionally, establishing 110 the tele-operated driving further comprises sending a request to take control over the transportation vehicle by the remote control center.

The tele-operated driving session can be understood as a part or the entirety of acts for controlling the transportation vehicle from remote and for communicating between the transportation vehicle and the remote control center for ToD.

Further, method 100 comprises obtaining 120 a predicted latency of a communication link between the remote control center and the transportation vehicle for the tele-operated driving session. The predicted latency, e.g., relates to an estimated latency of the communication link at a time in the future and, e.g., is determined using previous latency measurements as input to an extrapolation for determining the predicted latency. Since the latency of the communication link or changes of this latency may relate to movements of the transportation vehicle, optionally a position of the transportation vehicle may be used to determine the predicted latency.

Also, method 100 comprises adapting 130, based on the predicted latency, at least one codec parameter for coding the information. Adapting 130 the at least one codec parameter based on the predicted latency, e.g., allows to adjust a time period/duration for processing the information using the at least one codec parameter with respect to the predicted latency. The at least one codec parameter, e.g., is determined such that a total latency including the predicted latency and a latency for coding the information using the codec parameter is at an appropriate level for ToD. This may enable the remote control center or an operator for controlling the transportation vehicle from remote to maneuver the transportation vehicle safely based on the information.

It is noted that adapting 130 the at least one codec parameter may optionally comprise adapting multiple codec parameters of a codec or selecting coding parameters and/or a codec from a plurality of coding parameters or codecs. E.g., adapting 130 the at least one codec comprises selecting a codec from a plurality of codecs, e.g., from a lookup table, as stated in more detail later.

The information comprises, e.g., video data, radar data, object data and/or lidar data of the environment of the transportation vehicle. Video data, e.g., comprises data of the environment from a video camera which may be installed at the transportation vehicle. Lidar data and radar data may comprise data of the environment from a lidar sensor and a radar sensor, respectively. Object data, e.g., comprises information on a position, a size, a transportation vehicle type/traffic participant type and/or a shape of another transportation vehicle and/or traffic participant.

In some exemplary embodiments, the information may comprise video data. Accordingly, the codec and the at least one codec parameter may be a codec parameter or codec for coding and/or encoding video data.

It is noted that although the term "codec" refers to a pair of algorithms for encoding and decoding, the skilled person will appreciate that the codec may also stand for one of those algorithms depending on the context. E.g., when it is said that "a codec is used for encoding", an algorithm for encoding of the respective codec is meant. Vice versa, the term "codec" particularly refers to the algorithm from decoding in connection with decoding the information.

Optionally, method 100 comprises obtaining latencies for encoding and decoding for one or more codec parameters, e.g., for multiple codecs and/or codec settings specified by the one or more codec parameters.

For this, method 100 can comprise obtaining for the one or more codec parameters a latency for encoding the information at the transportation vehicle. The latency for encoding the information, e.g., is determined based on a buffering time for a respective codec and/or codec setting. The skilled person will be aware that also an available computing power may be considered to obtain the latency encoding the information at the transportation vehicle using the respective codec or codec setting.

Also, method 100 can comprise receiving, from the remote control center, for the one or more codec parameters a latency for decoding the encoded information at the remote control center. The transportation vehicle, e.g., may request the latencies for decoding the encoded information from the remote control center. For this, the transportation vehicle can (wirelessly) communicate to the remote control center for which one or more codec parameters, e.g., requested codecs and/or codec settings, latencies are requested. Subsequently, the remote control center may determine the latencies for decoding the encoded information for the requested codecs and/or codec settings. The transportation vehicle and the remote control center, e.g., communicate the codec parameters and/or the latencies using a cellular or local area network. In particular, the transportation vehicle and the remote control center may use the communication link for communication.

In this way, latencies for decoding and encoding can be determined for multiple codec parameters, e.g., for multiple codecs and/or codec settings.

In knowledge of the latencies for encoding and decoding, the transportation vehicle can adapt the one or more codec parameter with respect to those latencies. E.g., adapting 130 the at least one codec parameter may comprise adapting the at least one codec parameter based on the latencies for encoding the information and decoding the encoded information. In this way, the one or more codec parameter may be further adapted with respect to the latencies for encoding and decoding such that a total latency including the latencies of the communication link, for encoding, and for decoding may be kept at an appropriate level for ToD and with respect to (predicted) variations of the latency of the communication link.

For the total latency, also other latencies between capturing the information and displaying the information to the operator in the remote control center may be considered. For example, the total latency also comprises latencies for processing the information at the transportation vehicle before and/or after encoding the information and latencies for processing the (encoded) information before and/or after decoding the encoded information. Thus, the total latency is indictive for a delay of the information between capturing the information and displaying the information to the operator. Again, the at least one codec parameter may be determined such that the total latency/the delay of the information is kept at an appropriate level for ToD with respect to (predicted) variations of the latency of the communication link.

In some exemplary embodiments, method 100 further comprises obtaining a maximum latency for the communication of the information in the tele-operated driving session.

The maximum latency, e.g., is a maximum tolerable latency for ToD. The maximum latency can be understood as a maximum value or a limit for the total latency where the transportation vehicle can be safely controlled from remote, i.e., by the operator and the remote control center. In particular, the maximum latency may be a predefined constant or a variable, as stated in more detail later.

In some exemplary embodiments, adapting 130 the at least one codec parameter comprises adapting the at least one codec parameter based on the maximum latency. In this way, an appropriate codec and/or codec setting may be determined for the ToD session such that the maximum tolerable latency may not be exceeded.

The maximum tolerable latency may particularly depend on the transportation vehicle and/or a traffic situation in the environment of the transportation vehicle. The maximum tolerable latency for a transportation vehicle may be higher, the slower the transportation vehicle drives and/or the less dense a traffic (e.g., the less other transportation vehicles are in the environment of the transportation vehicle). Hence, obtaining the maximum latency may comprise determining the maximum latency based on information on the transportation vehicle and/or a traffic situation. Consequently, the at least one codec parameter is determined with respect to information on the transportation vehicle (e.g., a velocity/speed, braking power) and/or with respect to the traffic situation (e.g., a traffic density or a distance to other transportation vehicles). Eventually, this can make the ToD safer. E.g., this allows the operator at least a predefined reaction time when controlling the transportation vehicle.

Also, method 100 may comprise obtaining a predicted data rate of the communication link and adapting 130 the at least one codec parameter may comprise adapting the at least one codec parameter based on the predicted data rate of the communication link. The data rate of the communication link, e.g., is a maximum available data rate and the codec parameter is determined such that the maximum available data rate is exploited (e.g., to provide the highest possible video quality of video data) but the data rate is also not exceeded. This way, the communication link might not be overloaded.

Method 100 may be executed by the transportation vehicle. In particular, method 100 may be executed by an apparatus installed on the transportation vehicle.

Figure 2:
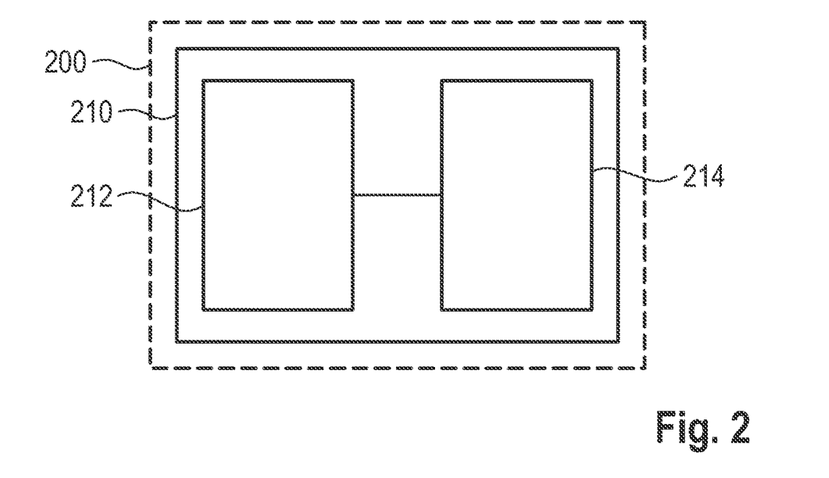
FIG. 2 illustrates a block diagram of an exemplary embodiment of an apparatus for executing the above method for a transportation vehicle.

FIG. 2 illustrates a block diagram of an exemplary embodiment of an apparatus 210 for executing the above method 100 for a transportation vehicle. As indicated by dashed lines in FIG. 2, the apparatus 210 is optionally installed at a transportation vehicle 200.

The apparatus 210 comprises one or more interfaces 212 configured to communicate in a communication network. Also, the apparatus 210 comprises a data processing circuit 214 configured to control the one or more interfaces 212. The data processing circuit 214 is further configured to execute the method 100 proposed herein.

In disclosed embodiments, the one or more interfaces 212 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 212 may comprise further components to enable according communication in the (mobile) communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 212 may be coupled to one or more antennas, which may correspond to any transmit and/or receive antennas, such as horn antennas, dipole antennas, patch antennas, sector antennas etc. In some examples the one or more interfaces 212 may relate to method or mechanism for communication with the remote control center and/or establishing the tele-operated driving session. Also, the one or more interfaces 212 are coupled to the data processing circuit 214.

The interfaces 212, e.g., are configured to use a wireless local area network and/or a cellular network for the communication with the remote control center.

In disclosed embodiments, the data processing circuit 214 may be implemented using one or more processing units, one or more processing devices, any method or mechanism for processing, such as a processor, a computer or a programmable hardware component being operable with accordingly adapted software. In other words, the described function of the data processing circuit 214 may as well be implemented in software, which is then executed on one or more programmable hardware components. Such hardware components may comprise a general-purpose processor, a Digital Signal Processor (DSP), a micro-controller, etc. The data processing circuit 214 may be configured to carry out any of the methods 100 described herein. In disclosed embodiments, the data processing circuit 214 is configured to establish the tele-operated driving session between the transportation vehicle and a remote control center, to obtain a predicted latency of a communication link between the remote control center and the transportation vehicle for the tele-operated driving session, and to adapt, based on the predicted latency, the at least one codec parameter for coding the information.

As mentioned before with reference to method 100, the apparatus 210 allows the transportation vehicle to communicate information (e.g., video data, object data, lidar data, radar data) for tele-operated driving with a remote control center and to determine the at least one codec parameter such that a total latency including the predicted latency and a latency for coding the information using the codec parameter is at an appropriate level for ToD. This may enable the remote control center or an operator for controlling the transportation vehicle from remote to maneuver the transportation vehicle safely based on the information.

Optionally, the apparatus 210 is configured to implement/execute other optional embodiments of method 100. For example, the one or more interfaces 212 and the data processing circuit 214 are also configured to receive, from the remote control center, for one or more codec parameters a latency for decoding the encoded information at the remote control center and to adapt the at least one codec parameter, in accordance with optional embodiments of method 100, based on the latencies for encoding and decoding the information. Accordingly, the remote control center may provide such latencies to the transportation vehicle 200 and the apparatus 210, respectively.

Figure 3:
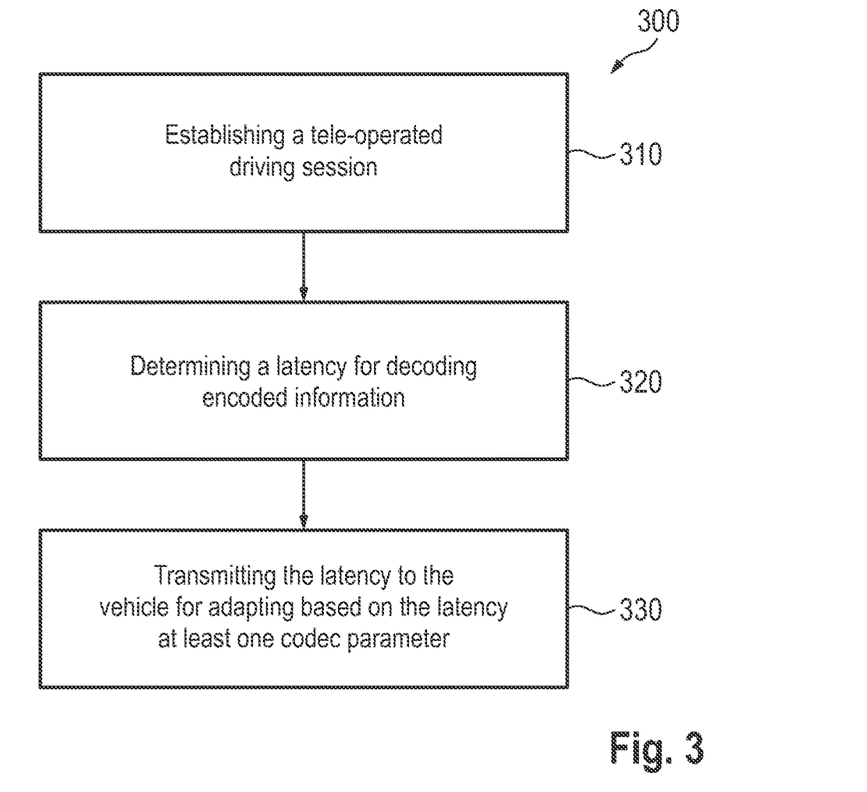
FIG. 3 illustrates a block diagram of an exemplary embodiment of a method for a remote control center.

FIG. 3 illustrates a block diagram of an exemplary embodiment of a method 300 for a remote control center.

Method 300 comprises establishing 310 a tele-operated driving session between the remote control center and a transportation vehicle. Also, method 300 comprises determining 320 a latency for decoding encoded information for communication in the tele-operated driving session. Further, method 300 comprises transmitting 330 the latency to the transportation vehicle for adapting based on the latency at least one codec parameter for coding the information. This allows the transportation vehicle to adapt the at least one codec parameter with respect to the latency for decoding the encoded information for communication in the tele-operated driving session. The information, e.g., is encoded by the transportation vehicle for the communication with the remote control center. Method 300 also allows to determine for multiple codec parameters a latency for decoding the encoded information and to transmit the multiple determined latencies to the transportation vehicle to enable the transportation vehicle to adapt the at least one codec parameter based on or with respect to the latencies from the remote control center.

In particular, method 300 enables the transportation vehicle to adapt the at least one codec parameter with respect to the latencies from the remote control center such that a total latency including the latency for decoding the encoded information is at or not higher than an appropriate level for ToD.

Method 300 may be executed by the remote control center. In particular, method 300 may be executed by an apparatus installed at the remote control center.

Figure 4:
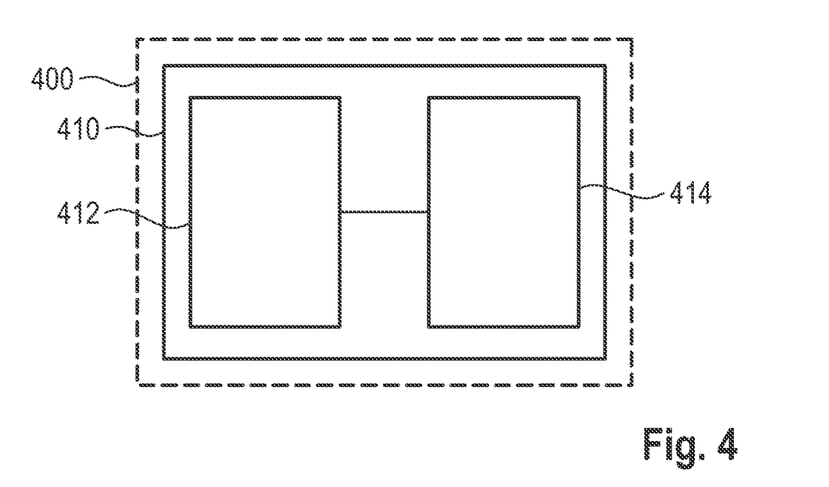
FIG. 4 illustrates a block diagram of an exemplary embodiment of an apparatus for executing the above method for a remote control center.

FIG. 4 illustrates a block diagram of an exemplary embodiment of an apparatus 410 for executing the above method 300 for a remote control center. As indicated by dashed lines in FIG. 4, the apparatus 410 is optionally installed at a remote control center 400.

The apparatus 410 comprises one or more interfaces 412 configured to communicate in a communication network. The apparatus 410 further comprises a data processing circuit 414 configured to control the one or more interfaces 412 and to execute one of the methods proposed herein for a remote control center. In particular, the data processing circuit 414 may be configured to execute method 300 for a remote control center.

In disclosed embodiments, the one or more interfaces 412 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 412 may comprise further components to enable according communication in the (mobile) communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 412 may be coupled to one or more antennas, which may correspond to any transmit and/or receive antennas, such as horn antennas, dipole antennas, patch antennas, sector antennas etc. In some examples the one or more interfaces 412 may relate to methods or mechanisms for communication with the transportation vehicle and/or establishing the tele-operated driving session. Also, the one or more interfaces 412 are coupled to the data processing circuit 414 to enable the data processing circuit 414 to execute the methods for the remote control center using the one or more interfaces 412. Thus, the data processing circuit 414, e.g., is enabled to receive and transmit information using the one or more interfaces 412 for executing the methods 300.

In exemplary embodiments, the data processing circuit 414 may be implemented using one or more processing units, one or more processing devices, any method or mechanism for processing, such as a processor, a computer or a programmable hardware component being operable with accordingly adapted software. In other words, the described function of the data processing circuit 414 may as well be implemented in software, which is then executed on one or more programmable hardware components. Such hardware components may comprise a general-purpose processor, a Digital Signal Processor (DSP), a micro-controller, etc. The data processing circuit 414 may be configured to carry out any of the methods 300 described herein. In exemplary embodiments, the data processing circuit 414 is configured to establish the tele-operated driving session between the transportation vehicle and a remote control center, to determine a latency for decoding encoded information for communication in the tele-operated driving session and to transmit the latency to the transportation vehicle for adapting based on the latency at least one codec parameter for coding the information.

The data processing circuit 414, e.g., uses one or more of the interfaces 412 for communication in the tele-operated driving session and to transmit the latency to the transportation vehicle. The one or more interfaces 412 may be configured to use a wireless local area network and/or a cellular network for the communication with the transportation vehicle and for transmitting the latency to the transportation vehicle.

As explained before, method 300 may be also applied to determine and transmit for multiple codec parameters a latency for decoding the encoded information. Accordingly, the data processing circuit 414 may be configured to determine and transmit for multiple codec parameters a latency for decoding the encoded information.

In the following, an application of the proposed transportation vehicle, methods, apparatuses, and computer programs is described with reference to FIG. 5.

Figure 5:
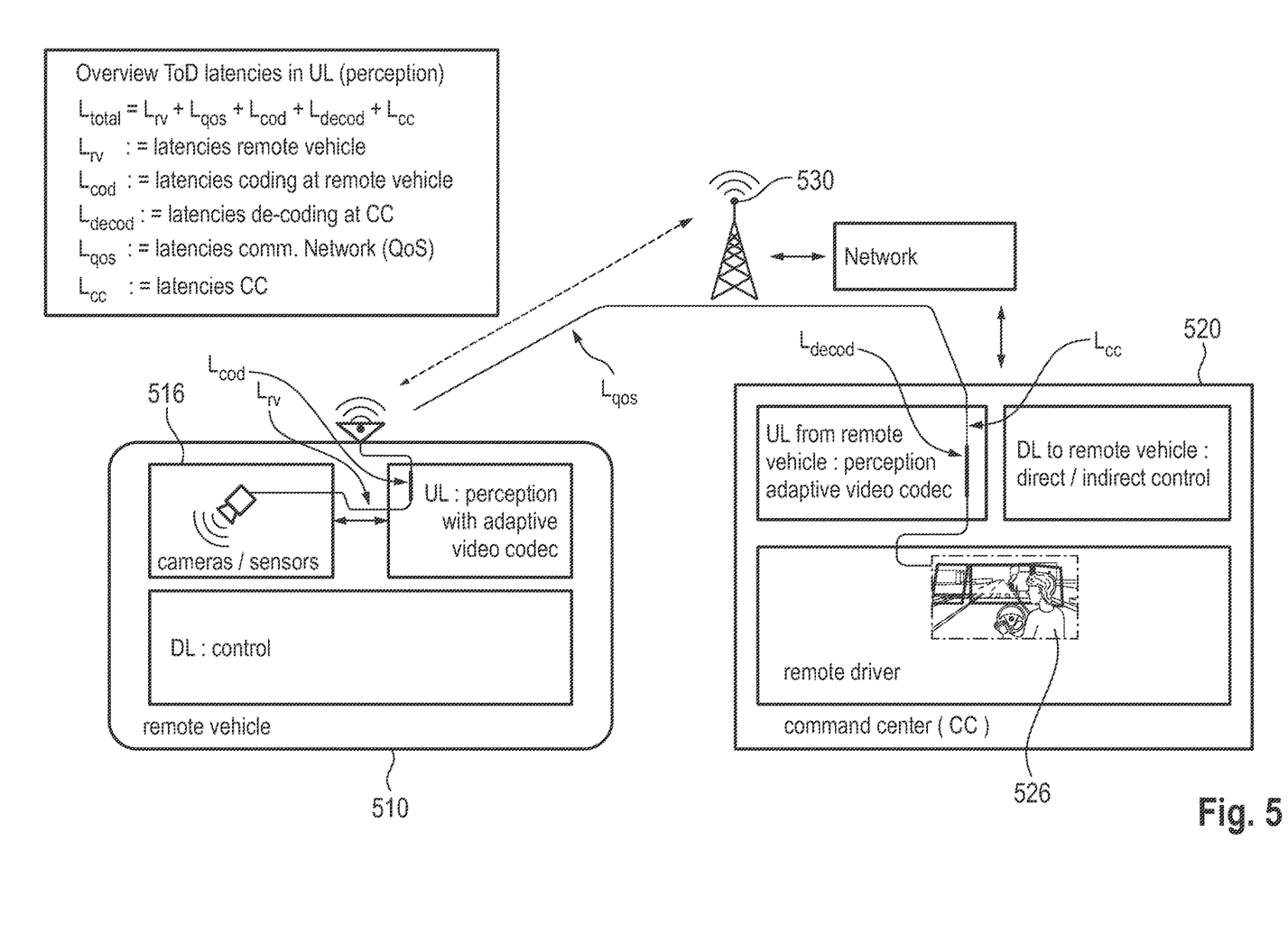
FIG. 5 schematically illustrates an application of the proposed apparatuses and methods.

As can be seen from FIG. 5, a (autonomously driving) transportation vehicle 510 and an remote control center 520 may establish a tele-operated driving session and communicate information for ToD via a (communication) network 530 including the transportation vehicle 510 and the remote control center 520. The network 530, e.g., is a cellular network.

The quality of service (QoS) of the communication over the network 530 may change over time. Changes of the QoS may further also involve changes of a delay of information for communication between the transportation vehicle 510 and the remote control center 520. This delay, e.g., relates to a duration or a delay between capturing the information at the transportation vehicle and displaying the information at the remote control center. Due to changes of the QoS this delay may reach an inappropriate level for ToD. As can be seen from FIG. 5, this delay may include different latencies. As can be seen from FIG. 5, those latencies may include: latencies Lrv at the transportation vehicle 510, latencies Lcod of video coding at the transportation vehicle 510, latencies Lqos in the (communication) network 530, latencies Lcc at the remote control center 530, and latencies Ldecod of video decoding at the remote control center 520.

Lcod and Ldecod may depend on a codec and/or a codec setting for coding and decoding the information. The information, e.g., includes video data from one or more cameras 516 installed at the transportation vehicle 510. Accordingly, the codec is a video codec and the codec setting is a codec setting of a video codec, respectively. It should be noted that although only video data is taken as information for the following description, the proposed concept/application can also be applied to other data, such as lidar data, radar data, and/or object data.

Lrv and Lcc, e.g., relate to delays/latencies due to processing the video data at the transportation vehicle 510 and the remote control center 520 before and/or after coding and decoding the video data, respectively.

Lqos, e.g., refer to a duration or a delay between emitting encoded video data from the transportation vehicle 510 and receiving the encoded video data at the remote control center 520 via a communication link between the transportation vehicle 510 and the remote control center 520 in the (communication) network 530. Due to changes of the QoS, the Lqos may change. Such changes may cause the duration or delay between capturing the information at the transportation vehicle 510 and displaying the information at the remote control center 520 to exceed an inappropriate level for ToD. In the present disclosure this delay or duration is referred to as a total latency Ltotal (Ltotal=Lqos+Lrv+Lcc+Lcod+Ldecod).

In some exemplary embodiments, the transportation vehicle 510 provides the remote control center 520 with information on available codecs and/or codec settings and the remote control center 520 determines and provides the transportation vehicle 510 with the latencies Lcc and Ldecod for the available codecs and/or codec settings.

In accordance with the proposed methods and/or apparatuses, the transportation vehicle 510 can obtain a predicted (i.e., an estimated future Lqos) latency of the communication link (i.e., a predicted Lqos) and adapt the codec and/or the codec setting by adapting at least one codec parameter to keep Ltotal at an appropriate level for ToD in case of changes of the QoS, and thus, of the Lqos.

For example, adapting the codec includes selecting a (video) codec for coding and decoding the video data from a plurality of different (available) (video) codecs. The codec, e.g., is selected from a look-up table comprising the plurality of different codecs. The skilled person having benefit from the present disclosure will appreciate that the different codecs may lead to different Lcod and Ldecod. The skilled person will also understand that the lower the latencies Lcod and Ldecod, the higher may be a data rate required for transmitting the video data and vice versa as higher compression for a lower data rate may require more time and thus, results in a higher latency for coding the video data. In other words, higher compression may come with the price of higher latencies. The different codecs may exhibit different compression approaches resulting in different Lcod and Ldecod for the different codecs.

A basic idea of the proposed concept, e.g., is to obtain the predicted Lqos and to adapt a codec parameter, e.g., by selecting the codec from a plurality of codecs, with respect to the predicted Lqos to keep the total latency Ltotal on an appropriate level for ToD in case of changes of the Lqos.

The predicted Lqos, e.g., is determined based on previous measurements of the Lqos and/or based on a position of the transportation vehicle 510 since the Lqos may depends on a relative position or a distance to an access node of the network 530.

To keep the Ltotal at an appropriate level for ToD, e.g., a maximum total latency Lmax is determined and the codec is selected from the available codecs such that a predicted Ltotal including the predicted Lqos is lower than or equal to Lmax:

$$L_{total} = L_{rv} + L_{qos} + L_{decod} + L_{cod} + L_{cc} < L_{max}$$

$L_{max}$, e.g., is a measure for $L_{total}$ which can be tolerated when controlling the transportation vehicle 510 from remote. The maximal latency can be derived based on or with respect to a velocity/speed of the transportation vehicle 510, its environment, and a reaction time of an operator 526 at the remote control center 520.

Changes of the QoS may also involve changes of a data rate of the communication link. Therefore, also a predicted data rate of the communication link may be obtained for adapting the at least one codec parameter (e.g., by selecting a codec from the plurality of codecs) (also) based on the predicted data rate of the communication link.

The skilled person will understand that the predicted data rate may depend on a communication technology (e.g., 3rd Generation Partnership Project (3GPP) or Dedicated Short Range Communication (DSRC)) used for the communication link, a bandwidth, a signal strength, and/or a position of the transportation vehicle 510. Therefore, the predicted data rate can be obtained based on the position and/or the communication technology. Optionally, the predicted data rate can be obtained based on previous measurements of the predicted data rate. The predicted data rate, e.g., relates to the same point time or period in time as the predicted latency.

Adapting the at least one codec parameter (e.g., by selecting the codec from the plurality of codecs) based on the predicted latency and on the predicted data rate, e.g., allows to exploit (but not exceed) a data rate of the communication link (e.g., to provide a desired or the highest possible video quality of the video data) while keeping the Ltotal at an appropriate level for ToD in case of changes of the QoS and of the data rate.

In other words, the at least one codec parameter (codec and/or codec settings) can be adapted with respect to a PQoS profile such that the total latency does not exceed the maximum (total) latency and the data rate is not exceeded according to:

$$DR_{codec} < DR_{qos} \cap L_{total} = L_{rv} + L_{qos} + L_{decod} + L_{cod} + L_{cc} < L_{max},$$

wherein $DR_{codec}$ refers to the data rate of an output of a respective codec and/or codec setting, and wherein $DR_{qos}$ refers to the data rate of the communication link.

In particular, the transportation vehicle 510 may adapt the at least one codec parameter (e.g., by adapting a codec setting and/or selecting a codec from a plurality of codecs) such that the highest quality for the video data is provided at the remote control center 520 but the data rate DRqos and maximum (total) latency Lmax are not exceeded.

This is further explained by reference to the following exemplary scenarios:

For example, multiple codecs providing different latencies Lcod and Ldecod and different data rates DRcodec with respect to each other are available to the transportation vehicle 510.

I. In a first exemplary scenario, the predicted QoS provides increased data rates DRqos and decreased latencies Lqos. In this scenario, a codec providing high video quality at the cost of higher latencies Lcod and Ldecod and data rate DRcodec with respect to the other codecs may be used. Thus, the total latency Ltotal may not exceed the maximum (tolerable) latency Lmax while providing the highest possible video quality.

II. In a second exemplary scenario, the predicted QoS provides increased data rates DRqos but also increased latencies Lqos. In this scenario, a codec providing low latencies Lcod and Ldecod but higher data rate DRcodec with respect to the other codecs may be used.

III. In a third exemplary scenario, the predicted QoS provides decreased data rates DRqos and decreased latencies Lqos. In this scenario, a codec providing low data rate DRcodec at the cost of higher latencies Lcod and Ldecod with respect to the other codecs may be used.

Thus, in the scenarios the data rate DRqos is exploited while keeping the total latency Ltotal at a suitable level for ToD. This may enable the operator 526 to control the transportation vehicle 510 from remote more safely than if the a lower video quality and/or a higher total latency is provided.

As already mentioned, in disclosed embodiments the respective methods may be implemented as computer programs or codes, which can be executed on a respective hardware. Hence, another exemplary embodiment is a computer program having a program code for performing at least one of the above methods, when the computer program is executed on a computer, a processor, or a programmable hardware component. A further exemplary embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The exemplary embodiments are also intended to cover computers programmed to perform the methods described herein or (field) programmable logic arrays ((F)PLAs) or (field) programmable gate arrays ((F)PGAs), programmed to perform the above-described methods.

LIST OF REFERENCE SIGNS 100 method for a transportation vehicle
110 establishing a tele-operated driving session
120 obtaining a predicted latency
130 adapting, based on the predicted latency, at least one codec parameter
200 transportation vehicle
210 apparatus
212 one or more interfaces
214 data processing circuit
300 method for a remote control center
310 establishing a tele-operated driving session
320 determining a latency for decoding encoded information
330 transmitting the latency to the transportation vehicle for adapting based on the latency at least one codec parameter
400 remote control center
410 apparatus
412 one or more interfaces
414 data processing circuit
510 transportation vehicle 516 one or more cameras
520 remote control center
526 operator
530 network
$L_{total}$, $L_{rv}$, $L_{qos}$, $L_{decod}$, $L_{cod}$, $L_{cc}$, $L_{max}$ latencies
$DR_{codec}$, $DR_{qos}$ data rates

The invention claimed is:

1. An apparatus comprising:
one or more interfaces to communicate in a communication network; and
a data processing circuit to control the one or more interfaces, wherein the data processing circuit executes a method for a transportation vehicle and for processing information for communication in a tele-operated driving session, wherein the method includes:
establishing a tele-operated driving session between the transportation vehicle and a remote control center;
obtaining a predicted latency of a communication link between the remote control center and the transportation vehicle for the tele-operated driving session;
obtaining for one or more codec parameters a latency for encoding the information at the transportation vehicle;
receiving, from the remote control center, for the one or more codec parameters, a latency for decoding the encoded information at the remote control center; and
adapting, based on the predicted latency, at least one codec parameter for coding the information, wherein adapting the at least one codec parameter comprises adapting the at least one codec parameter based on the latencies for encoding and decoding the information.

2. The apparatus of claim 1, wherein the information comprises video data, radar data, object data and/or lidar data of the environment of the transportation vehicle.

3. The apparatus of claim 1, wherein the method further includes obtaining a maximum latency for the communication of the information in the tele-operated driving session, wherein adapting the at least one codec parameter comprises adapting the at least one codec parameter based on the maximum latency.

4. The apparatus of claim 3, wherein the obtaining the maximum latency comprises determining the maximum latency based on information on the transportation vehicle and/or a traffic situation.

5. The apparatus of claim 1, wherein the method further includes obtaining a predicted data rate of the communication link, wherein adapting the at least one codec parameter comprises adapting the at least one codec parameter based on the predicted data rate of the communication link.

6. A transportation vehicle comprising the apparatus of claim 1.

7. A non-transitory computer readable medium including a computer program having a program code for performing the method of claim 3 when the computer program is executed on a computer, a processor, or a programmable hardware component.

8. A method for a transportation vehicle and for processing information for communication in a tele-operated driving session, the method comprising:
establishing a tele-operated driving session between the transportation vehicle and a remote control center;
obtaining a predicted latency of a communication link between the remote control center and the transportation vehicle for the tele-operated driving session;
obtaining for one or more codec parameters a latency for encoding the information at the transportation vehicle;
receiving, from the remote control center, for the one or more codec parameters, a latency for decoding the encoded information at the remote control center; and
adapting, based on the predicted latency, at least one codec parameter for coding the information, wherein adapting the at least one codec parameter comprises adapting the at least one codec parameter based on the latencies for encoding and decoding the information.

9. The method of claim 8, wherein the information comprises video data, radar data, object data and/or lidar data of the environment of the transportation vehicle.

10. The method of claim 8, further comprising obtaining a maximum latency for the communication of the information in the tele-operated driving session, wherein adapting the at least one codec parameter comprises adapting the at least one codec parameter based on the maximum latency.

11. The method of claim 10, wherein the obtaining the maximum latency comprises determining the maximum latency based on information on the transportation vehicle and/or a traffic situation.

12. The method of claim 8, further comprising obtaining a predicted data rate of the communication link, wherein adapting the at least one codec parameter comprises adapting the at least one codec parameter based on the predicted data rate of the communication link.

13. A non-transitory computer readable medium including a computer program having a program code for performing the method of claim 8 when the computer program is executed on a computer, a processor, or a programmable hardware component.

* * * * *